United States Patent
Oh et al.

(10) Patent No.: US 9,104,280 B2
(45) Date of Patent: Aug. 11, 2015

(54) TOUCH PANEL

(71) Applicant: SAMSUNG ELECTRO-MECHANICS CO., LTD., Suwon (KR)

(72) Inventors: Sang Hwan Oh, Suwon (KR); Jin Uk Lee, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 115 days.

(21) Appl. No.: 13/845,486

(22) Filed: Mar. 18, 2013

(65) Prior Publication Data

US 2014/0184936 A1 Jul. 3, 2014

(30) Foreign Application Priority Data

Dec. 27, 2012 (KR) .................. 10-2012-0154869

(51) Int. Cl.
*G02F 1/1343* (2006.01)
*G06F 3/044* (2006.01)
*G02F 1/1337* (2006.01)

(52) U.S. Cl.
CPC .......... *G06F 3/044* (2013.01); *G02F 1/133707* (2013.01); *G02F 1/134336* (2013.01); *G06F 2203/04103* (2013.01); *G06F 2203/04112* (2013.01)

(58) Field of Classification Search
CPC ................... G02F 1/134336; G02F 1/133707; G02F 1/134363
USPC .......................................... 349/141–142, 146
See application file for complete search history.

(56) References Cited

U.S. PATENT DOCUMENTS

| | | | |
|---|---|---|---|
| 6,473,235 B2 | 10/2002 | Toyoshima | |
| 7,499,038 B2 | 3/2009 | Nishikawa | |
| 2002/0025441 A1* | 2/2002 | Hieda et al. | 428/440 |
| 2011/0096005 A1* | 4/2011 | Kim et al. | 345/173 |
| 2012/0075209 A1* | 3/2012 | Lee et al. | 345/173 |
| 2013/0063371 A1* | 3/2013 | Lee et al. | 345/173 |
| 2014/0126113 A1* | 5/2014 | Ogiwara | 361/523 |

* cited by examiner

*Primary Examiner* — Phu Vu
(74) *Attorney, Agent, or Firm* — Ladas & Parry, LLP

(57) ABSTRACT

Disclosed herein is a touch panel. In the touch panel, electrode patterns included in the touch panel may be orthogonal to each other in an intersecting point, and formed of a combination of unit patterns having a bent straight line shape. Accordingly, it is possible to prevent a contact area of the electrode patterns that intersect in the intersecting point from being increasing, thereby reducing visibility of the electrode pattern.

9 Claims, 4 Drawing Sheets

TOUCH PANEL

CROSS REFERENCE TO RELATED APPLICATION

This application claims the benefit of Korean Patent Application No. 10-2012-0154869, filed on Dec. 27, 2012, entitled "Touch Panel", which is hereby incorporated by reference in its entirety into this application.

TECHNICAL FIELD

The present invention relates to a touch panel.

DESCRIPTION OF THE RELATED ART

With the development of computers using digital technology, computer-assisted devices have been developed, and personal computers, portable transmission devices, other information processing devices exclusive for individual, and the like perform a text and graphic process using a variety of input devices such as a keyboard, a mouse, and the like.

However, since the use of the computer has gradually widened due to the rapid progress of an information-oriented society, there are difficulties in effectively driving products only using the keyboard and the mouse currently acting as an input device. Accordingly, there is a demand for an input device which has a simple operation and less erroneous operation, and allows information input to be easily performed by anyone.

In addition, in input device-related technologies, concerns have changed toward high reliability, durability, innovativeness, design and processing-related technology, and the like in addition to satisfying general functions. Here, to achieve these purposes, as an input device in which information such as text, graphic, and the like can be input, a touch panel has been developed.

The touch panel is mounted on a display surface of an image display apparatus including a flat panel display device such as an organizer, a liquid crystal display (LCD) device, a plasma display panel (PDP), an electroluminescence (EL), or the like, and a display such as a cathode ray tube (CRT), and is used to allow a user to select his or her desired information while viewing the image display apparatus.

As such an electrode pattern, a transparent electrode is used, but the transparent electrode should have both optical transparency and conductivity, as widely known, and in general, indium-tin oxide (ITO) is widely used. The ITO has a property for being well attached to a rigid material such as glass, whereby the ITO becomes transparent when being sheeted and electricity therein flows well. However, since ITO is generated as a byproduct from zinc (Zn) mine or the like, ITO may not be used in flexible materials such as polymer substance and the like due to its unstable supply and demand and lack of flexibility. In addition, ITO should be fabricated under a high-temperature and high-pressure environment, and therefore production costs are increased.

In order to solve these problems, in recent years, a technique for attaching an electrode pattern in the form of mesh to a transparent substrate has been proposed. The form of mesh may refer to a shape in which unit patterns intersect with each other in a plurality of points like a net, as widely known.

In this instance, conductivity may be improved by the electrode pattern, but visibility may be deteriorated, and therefore an area occupied by the electrode pattern, that is, a contact area should be minimized.

However, since the electrode pattern is formed in a mesh-shape, a mutually intersecting portion is formed. Here, in the intersecting portion, a width of the electrode pattern may be relatively increased which causes an increase in a contact area, and therefore visibility of the electrode pattern may be increased due to non-uniformity of the pattern.

Meanwhile, the above-described transparent substrate and mesh-shaped electrode pattern have been widely known as described in the following Patent literature, and thus a repeated description thereof will be omitted.

PRIOR ART DOCUMENT

Patent Document (Patent Document 1) U.S. Pat. No. 6,473,235
(Patent Document 1) U.S. Pat. No. 7,499,038

SUMMARY OF THE INVENTION

The present invention has been made in an effort to provide a touch panel in which an angle between mutually intersecting electrode patterns may be made 90 degrees so as to prevent a contact area in a mutually intersecting portion from increasing, thereby reducing visibility of the electrode pattern.

According to a first embodiment of the present invention, there is provided a touch panel including: a transparent substrate; and a plurality of electrode patterns that are formed on the transparent substrate so as to be formed in a mesh shape, and are orthogonal to each other in an intersecting point.

In addition, the electrode pattern may be formed of a combination of at least one unit pattern having a bent straight-line shape.

In addition, the unit pattern may be bent in an intersecting point between the unit patterns so as to be orthogonal to each other.

In addition, the unit pattern may have the bent straight-line shape formed on the unit pattern corresponding to a portion other than the intersecting point between the unit patterns.

In addition, the transparent substrate may be made of any one of polyethylene terephthalate (PET), polycarbonate (PC), polymethly methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (K resin-containing biaxially oriented PS; BOPS), a glass, and a tempered glass.

In addition, one surface of the transparent substrate may be subjected to a high-frequency treatment or a primer treatment.

In addition, the electrode pattern may be made of any one of poly-3,4-ethylenedioxythiophene/polystyrene sulfonate (PEDOT/PSS), polyanilinc, polyacetylene, and poly-phenylene vinylene.

In addition, the electrode pattern may use a silver paste containing palladium or platinum.

In addition, the electrode pattern may use a hybrid silver paste containing silver powder having a diameter of 3 μm to 5 μm and silver nanoparticles having a diameter of 2 nm to 8 nm.

In addition, the unit pattern may be formed to have a pitch of 400 μm to 500 μm and an angle of 55 to 65 degrees.

DESCRIPTION OF THE PREFERRED EMBODIMENTS

Figure 1:
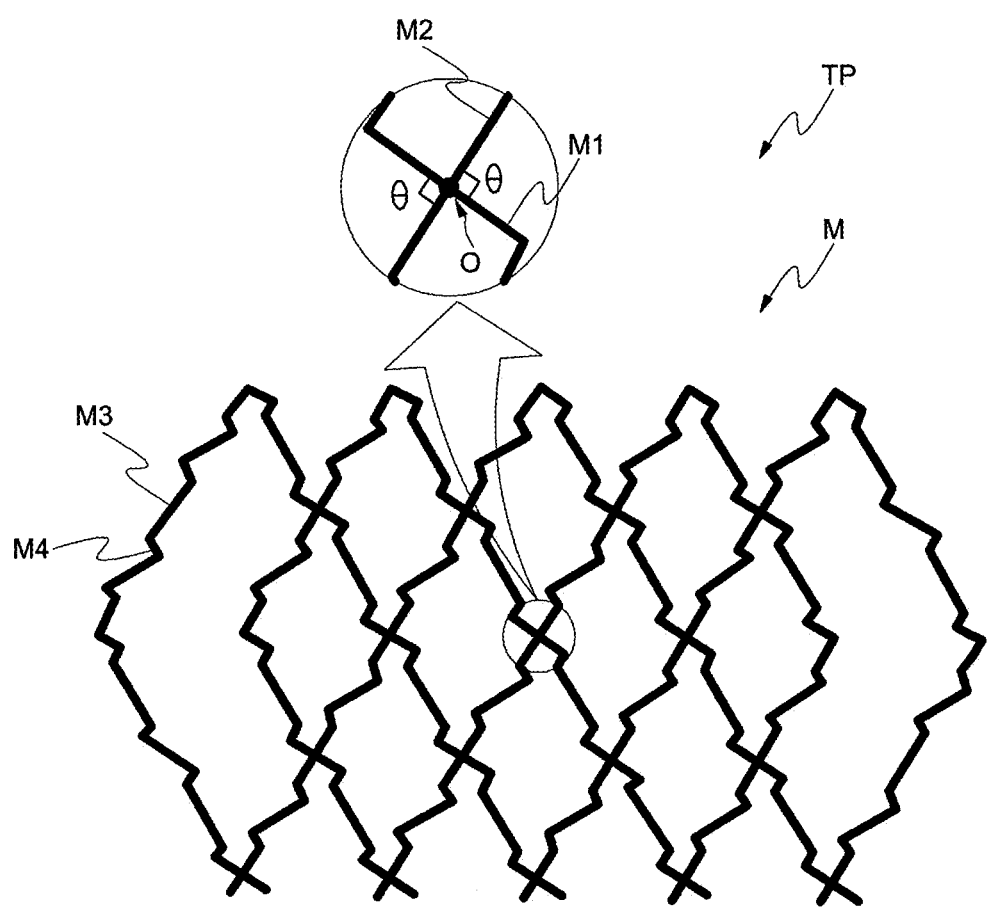
FIG. 1 is a conceptual diagram showing an electrode pattern according to an embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a conceptual diagram showing an electrode pattern according to an embodiment of the present invention. As shown in FIG. 1, a touch panel (TP) includes a transparent substrate (not shown) and a plurality of electrode patterns M that are formed on the transparent substrate so as to be formed in a mesh shape, and are orthogonal to each other in an intersecting point in an intersecting point O. Specifically, the electrode patterns M1 and M2 which intersect in the intersecting point O may have an angle of 90 degrees, and therefore a contact area in the intersecting point O may be minimized.

In the electrode pattern of the prior art, there are many cases in which the points which intersect with each other are the same, but an angle therebetween is an acute angle smaller than 90 degrees. In this case, as described above, the contact area in the intersecting point may be increased to cause occurrence of a relative difference of a width of the electrode pattern, whereby visibility of the electrode pattern may be increased.

In order to solve these problems, the touch panel according to an embodiment of the present invention may minimize the contact area between the electrode patterns by allowing the electrode patterns in the intersecting point of the electrode pattern to be orthogonal to each other, thereby reducing visibility of the electrode pattern Meanwhile, the electrode pattern M according to an embodiment of the present invention may be formed of a combination of unit patterns having a bent straight-line shape. As shown in FIG. 1, when the unit patterns M3 and M4 of the electrode pattern M are formed in a bent shape without being not on a straight line, a long straight line-shaped pattern is not generated. That is, the unit patterns M3 and M4 have a plurality of patterns having various tilts, and therefore it is easier to dispose the electrode patterns so as to be orthogonal to each other in the intersecting point.

In this instance, in the unit patterns M3 and M4, the bent straight line shape may be regularly repeated. That is, as described above, a bent shape may be regularly repeated so as to be orthogonal to each other in the intersecting point O. That is, a part of the pattern has a bent shape, and a part of the intersecting patterns also has a shape orthogonal to the bent shape, so that the same pattern may be disposed so as to be repeated.

Obviously, as shown in FIG. 1, the unit patterns may be formed as irregular patterns. That is, the electrode patterns may have bent portions to be orthogonal to each other in mutual intersecting points between the electrode patterns, and besides, the same bent shape may be appropriately formed other than the intersecting point so that visibility of the electrode pattern is reduced through a similar pattern to a point where the bent shapes of the intersecting point meet. However, in this case, a disposition and structure of the bent shape may be regularly shown, but obviously, the bent shape may be appropriately disposed in an irregular position. In particular, when the unit pattern is formed as an irregular pattern, the pattern may have more various tilts as described above, and therefore it is possible to more easily dispose the unit patterns so as to be orthogonal to each other in the intersecting point.

Figure 7:
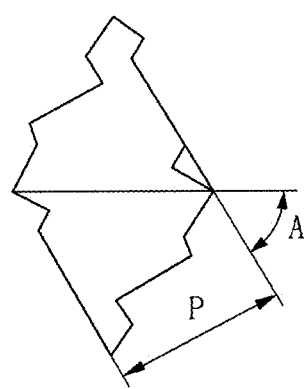
FIG. 7 is a drawing showing measurement criteria of a pitch and an angle of a unit pattern of a touch pattern according to an embodiment of the present invention.

In addition, as shown in FIG. 7, in the unit patterns M3 and M4 according to an embodiment of the present invention, a pitch and an angle value may indicate a formation size of the unit pattern. Considering visibility of the electrode pattern M formed of a combination of at least one unit pattern M3 and M4, a pitch (P) indicating a formation width of the unit patterns M3 and M4 may be formed in a range of 400 μm to 500 μm, and an angle (A) value that is a corresponding formation angle may be formed so as to have a range of 55 to 65 degrees. Here, when an upper electrode of an upper substrate and a lower electrode of a lower substrate are coupled to each other so as to face each other although not shown as a touch panel in a mutual method, a pitch of the unit pattern when the electrode patterns are overlapped to be visible by a user may be 200 μm to 250 μm.

As shown in FIG. 1, the unit patterns M3 and M4 according to an embodiment of the present invention may be formed in an irregular shape where the bent portion is formed, and therefore the pitch (P) may be measured based on the outermost one vertex of the unit patterns M3 and M4, and the angle (A) value may be measured with respect to an exterior angle (A) formed by intersecting one straight line that extends on the unit patterns M3 and M4 for measuring the pitch (P) from a parallel line passing a center portion of the unit patterns M3 and M4. Accordingly, even though the unit patterns M3 and M4 are formed in the irregular shape including the bent portion, the unit patterns M3 and M4 corresponding to the pitch (P) and the angle (A) value and the electrode pattern M including the unit patterns M3 and M4 may be formed.

Meanwhile, the transparent substrate may be made of any one of any one of polyethylene terephthalate (PET), polycarbonate (PC), polymethly methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (K resin-containing biaxially oriented PS; BOPS), a glass, and a tempered glass. In addition, in order to improve adhesive strength of the transparent substrate, one surface of the transparent substrate may be subjected to a high-frequency treatment and a primer treatment.

The electrode pattern M may be made of a conductive polymer, and specifically, any one of poly-3,4-ethylenedioxythiophene/polystyrene sulfonate (PEDOT/PSS), polyaniline, polyacetylene, and poly-phenylene vinylene. In addition, the electrode pattern M may be formed as a mesh pattern using copper (Cu), aluminum (Al), gold (Au), silver (Ag), titanium (Ti), palladium (Pd), Chrome (Cr), or a combination thereof. In this instance, the electrode pattern M may be formed by a plating process or a deposition process using a sputter. Meanwhile, when the electrode pattern M is made of copper (Cu), and a surface of the electrode pattern 22 may be subjected to a black-oxidation treatment. Here, the black-oxidation treatment is performed in such a manner that the surface of the electrode pattern M is oxidized to thereby extract $Cu_2O$ or CuO. Here, $Cu_2O$ is referred to as brown oxide due to its brown color and CuO is referred to as black oxide due to its black color. In this manner, the surface of the electrode pattern M is subjected to the black-oxidation treatment, and therefore light may be prevented from being reflected, and visibility of the touch panel M may be accordingly improved.

Meanwhile, the electrode pattern M may be made of metal obtained by exposing/developing a silver salt emulsion layer other than the above-described metal, and it is obvious for those skilled in the art that various types of materials capable of forming the mesh pattern using a conductive metal may be selected.

In addition, the electrode pattern M may use a hybrid silver paste containing silver powder having a diameter of 3 µm to 5 µm and silver nanoparticles having a diameter of 2 nm to 8 nm. In this instance, the hybrid silver paste contains the above-described silver powder and silver nanoparticles. In addition, a binder is made of thermosetting resin, dispersed by an organic solvent, and then hardened under a viscosity condition of 2 Pa·s to 100 Pa·s (180° C. to 220° C.).

In addition, the electrode pattern M may use a carbon paste such as carbon black or acetylene black. In this instance, the carbon paste may be chemically or physically stable and inexpensive.

Hereinafter, a formation method of the electrode pattern performed through a device for patterning the above-described electrode pattern will be described with reference to FIGS. 2 to 6.

According to an embodiment of the present invention, a device 100 for patterning the electrode pattern using a flat plate maker as shown in FIGS. 2 to 6 will be described.

The device 100 includes a flat plate maker 110 and a base 130 on which an ink application unit (DB), a transmission unit 120, and a transparent substrate S are formed.

In the flat plate maker 110, a plurality of grooves 112 are formed on a plate-shaped main body 111 of the flat plate maker 110. In this instance, the grooves 112 may have the same shape as the electrode pattern. Specifically, the grooves 112 may be formed of a combination of the unit patterns having the bent straight line shape, and formed so as to be orthogonal to each other in the intersecting point. When conductive ink is filled in the grooves 112, the same shape as the electrode pattern may be obtained as described above. Meanwhile, in FIG. 2, an example in which the grooves 112 are arranged on a straight line is illustrated, but this is merely an example for describing the grooves 112, and an actual shape of the grooves 112 may be the same as the electrode pattern. This will be equally applied to the following description, and thus repeated descriptions will be omitted.

Figure 2:
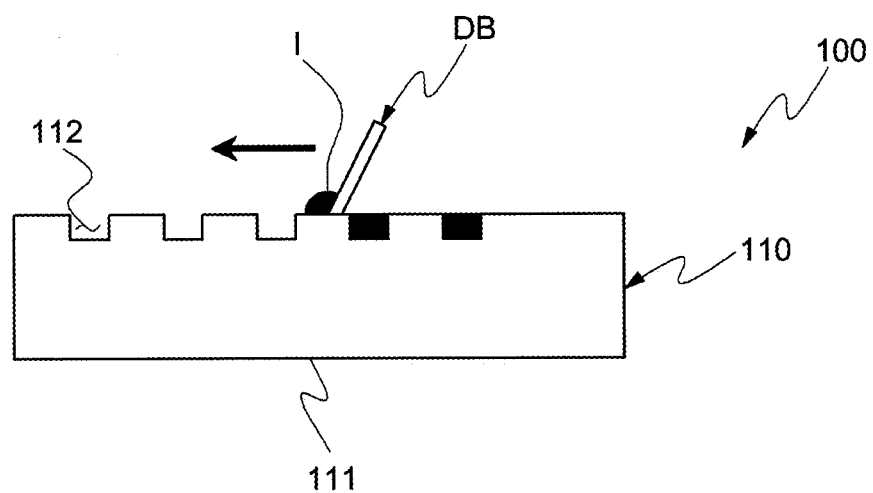
FIGS. 2 to 6 are conceptual diagrams showing a device of patterning an electrode pattern using a flat plate maker.

Meanwhile, in order to fill the grooves 112 of the flat plate maker 110 with conductive ink, the ink application unit DB may be provided. The ink application unit DB may enable the conductive ink (I) to be filled in the grooves 112 by ejecting and transferring the conductive ink (I). In FIG. 2, an example in which the ink application unit (DB) is tightly adhered to the flat plate maker 110 in the form of a thin plate is illustrated, but the present invention is not limited thereto. Different types of ink application unit (for example, an inkjet for ejecting the conductive ink) may be used as long as they can fill the conductive ink (I) in the grooves 112.

Figure 3:
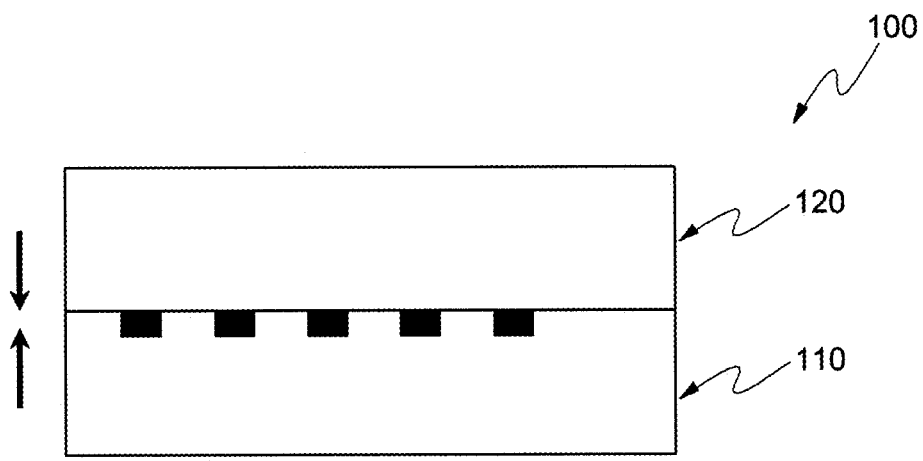
Figure 4:
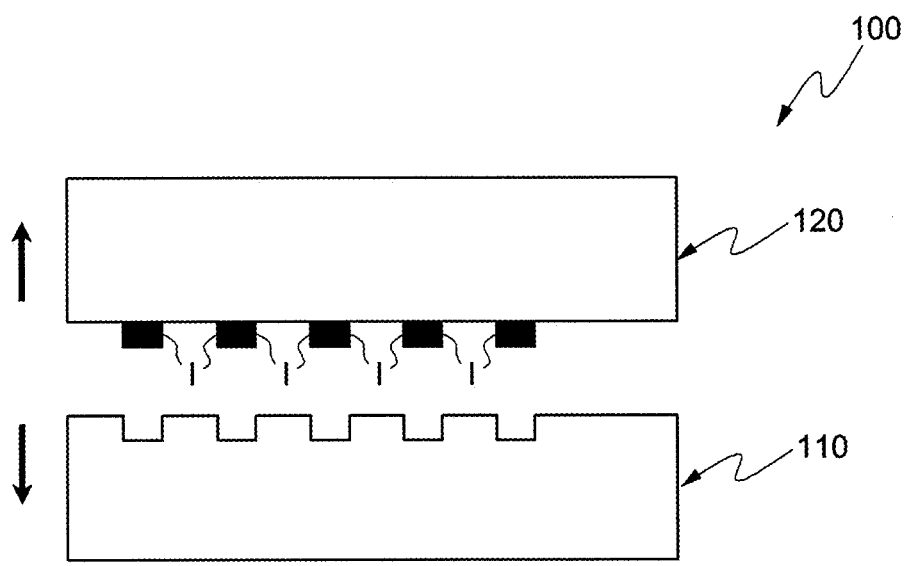

Meanwhile, as shown in FIGS. 3 and 4, the transmission unit 120 is brought into contact with the flat plate maker 110, so that the conductive ink (I) filled in the groove 112 may be transmitted from the flat plate maker 110 to the transmission unit 120. In this instance, the flat plate maker 110 and the transmission unit 120 may be made of polydimethylsiloxane (PDMS). The PDMS may be a silicon-based material as widely known, and adjust an adhesive force by which the conductive ink (I) is adhered by changing its composition. That is, as shown in FIG. 4, when an adhesive force of the transmission unit 120 is larger than an adhesive three of the flat plate maker 110, the conductive ink (I) filled in the grooves 112 of the flat plate maker 110 may be transcribed from the grooves 112 to the transmission unit 120 as shown in the drawing.

Figure 5:
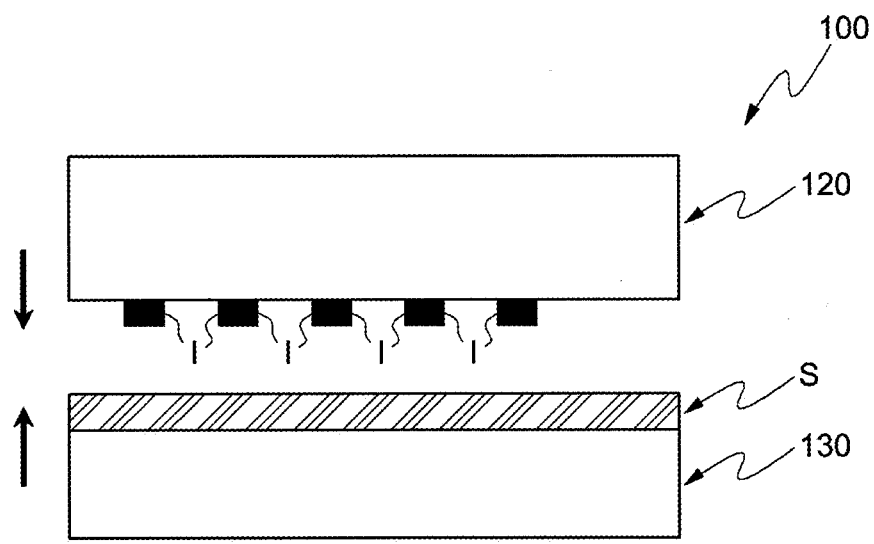
Figure 6:
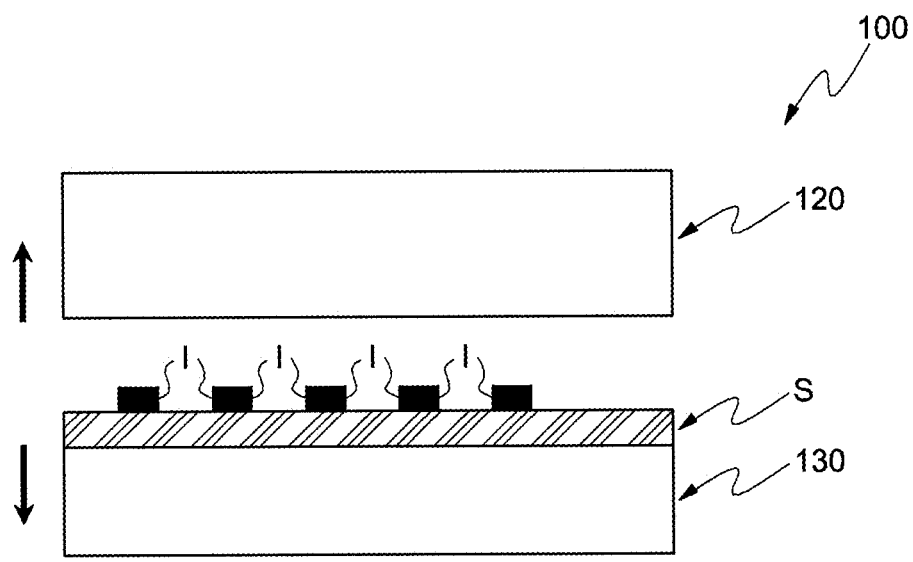

Meanwhile, in a case of the base 130, as shown in FIG. 5, a transparent substrate (S) may be disposed on an upper one side of the base 130. In this instance, when the transmission unit 120 is brought into contact with the transparent substrate (S) and then separated from the transparent substrate (S), the conductive ink (I) may be patterned on the transparent substrate (S) as shown in FIG. 6. Meanwhile, even in the case of FIG. 6, the conductive ink (I) may be transmitted from the transmission unit 120 to the transparent substrate (S) by adjusting an adhesive force of the conductive ink (I).

In this instance, the base 130 may be made of any one of a transparent glass, polyethylene terephthalate (PET), polyethylene naphthalate (PEN), polycarbonate (PC), polyimide (PI), and polyarylate.

The transparent glass is widely used due to its chemical stability and excellent strength.

The polyethylene terephthalate (PET) is obtained by performing condensation polymerization on ethylene and terephthalate, and has excellent chemical durability and excellent tensile strength as a thermosetting resin.

The polyethylene naphthalate (PEN) is obtained in such a manner that n single bodies containing two benzene rings, two ester groups, and two methyl groups are connected with each other, and have excellent durability and chemical stability.

The polycarbonate (PC) also has excellent heat-resistance excellent low-temperature characteristics (135° C. to −100° C.), is stable in light, and has small oxidation at the time of the process.

The polyimide (PI) is collectively referred to as polymers connected by amide bond-COHN—, and has excellent heat-resistance, mechanical characteristics, and electrical characteristics.

The polyarylate is a polycondensation based polymer that is obtained from bisphenol A as a mixed acid of terephthalic acid and isophthalic acid, and has excellent transparency and heat-resistance.

Hereinafter, referring again to FIGS. 2 to 6, a method for forming the electrode pattern on the transparent substrate (S) will be described.

First, as shown in FIG. 2, the grooves 112 of the flat plate maker 110 is filled with the conductive ink (I) using the ink application unit (DB). Thereafter, as shown in FIG. 3, the flat plate maker 110 and the transmission unit 112 are brought into contact with each other, and then separated from each other as shown in FIG. 4. Through this, the conductive ink (I) is transcribed from the grooves 112 to the transmission unit 120. In this instance, the transcribed conductive ink (I) has the same shape as the shape of the electrode pattern to be patterned. That is, the electrode pattern may be formed in a mesh shape, and formed of a combination of unit patterns having the bent straight line shape so as to be orthogonal to each other in the intersecting point. Thereafter, as shown in FIGS. 5 and 6, the transmission unit 120 and the base 130 are brought into contact with each other, and then separated from each other, and therefore the conductive ink (I) is adhered on the transparent substrate (S). The electrode pattern may be obtained by a process such as hardening and drying of the conductive ink (I) on the transparent substrate (S).

As described above, according to the embodiments of the present invention, a width of a portion where the electrode pattern of the touch panel intersects may be minimized to thereby reduce a relative difference with a width of patterns constituted of the electrode pattern, thereby reducing visibility of the electrode pattern.

In addition, the electrode patterns intersect with each other by 90 degrees on a mesh-pattern, and therefore a relative difference between each pattern width and an intersecting width between the patterns may be minimized, thereby outputting more definite image.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch panel comprising:
    a transparent substrate; and
    a plurality of electrode patterns that are formed on the transparent substrate so as to be formed in a mesh shape, and are orthogonal to each other in an intersecting point,
    wherein the electrode pattern is formed of a combination of at least one unit pattern having a bent straight-line shape, and wherein the unit pattern is formed in an irregular shape where bent portions are formed.

2. The touch panel as set forth in claim 1, wherein the unit pattern is bent in an intersecting point between the unit patterns so as to be orthogonal to each other.

3. The touch panel as set forth in claim 1, wherein the unit pattern has the bent straight-line shape formed on the unit pattern corresponding to a portion other than the intersecting point between the unit patterns.

4. The touch panel as set forth in claim 1, wherein the transparent substrate is made of any one of polyethylene terephthalate (PET), polycarbonate (PC), polymethly methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (K resin-containing biaxially oriented PS; BOPS), a glass, and a tempered glass.

5. The touch panel as set forth in claim 4, wherein one surface of the transparent substrate is subjected to a high-frequency treatment or a primer treatment.

6. The touch panel as set forth in claim 1, wherein the electrode pattern is made of any one of poly-3,4-ethylenedioxythiophene/polystyrene sulfonate (PEDOT/PSS), polyaniline, polyacetylene, and poly-phenylene vinylene.

7. The touch panel as set forth in claim 1, wherein the electrode pattern uses a silver paste containing palladium or platinum.

8. The touch panel as set forth in claim 1, wherein the electrode pattern uses a hybrid silver paste containing silver powder having a diameter of 3 um to 5 um and silver nanoparticles having a diameter of 2 nm to 8 nm.

9. The touch panel as set forth in claim 1, wherein the unit pattern is formed to have a pitch of 400 μm to 500 μm and an angle of 55 to 65 degrees.

* * * * *